(12) United States Patent
Dieziger

(10) Patent No.: US 7,383,845 B2
(45) Date of Patent: Jun. 10, 2008

(54) PORTABLE VEHICLE UNDERBODY WASHING SYSTEM

(75) Inventor: David Dieziger, Missoula, MT (US)

(73) Assignee: David D. Dieziger, Missoula, MT (US)

( * ) Notice: Subject to any disclaimer, the term of this patent is extended or adjusted under 35 U.S.C. 154(b) by 570 days.

(21) Appl. No.: 11/172,025

(22) Filed: Jul. 1, 2005

(65) Prior Publication Data

US 2007/0000526 A1    Jan. 4, 2007

(51) Int. Cl.
     *B08B 3/00*      (2006.01)
     *B08B 3/04*      (2006.01)
     *B08B 3/12*      (2006.01)
     *B08B 6/00*      (2006.01)

(52) U.S. Cl. ..................... 134/123; 134/45; 134/104.2; 134/111; 134/172; 134/198

(58) Field of Classification Search ................. 134/45, 134/104.2, 111, 123, 172, 198
See application file for complete search history.

(56) References Cited

U.S. PATENT DOCUMENTS

| | | | | |
|---|---|---|---|---|
| 2,879,787 A | * | 3/1959 | Ingram | 239/732 |
| 4,972,862 A | * | 11/1990 | Belanger et al. | 134/123 |
| 6,055,994 A | * | 5/2000 | Decker | 134/45 |
| 6,561,202 B1 | * | 5/2003 | Amadio | 134/123 |
| 7,111,631 B1 | * | 9/2006 | Breeze | 134/123 |

FOREIGN PATENT DOCUMENTS

| | | | |
|---|---|---|---|
| DE | 2851397 | * | 5/1980 |
| DE | 3802409 | * | 8/1989 |
| FR | 2608114 | * | 6/1988 |

* cited by examiner

*Primary Examiner*—Michael Barr
*Assistant Examiner*—Rita R Patel

(57) ABSTRACT

A portable washing device to be used to wash vehicles, consisting of a water supply tank (1), a gravity-flow supply hose (2) leading to a pressurizing pump (3), the pressurizing pump, a distribution hose (4), an underbody washer mechanism (5) of booms (6), rollers (7), and spray nozzles (8) and hand-held wands with nozzles (9) for spraying the wash water and nozzles for a final rinse, a waterproof fabric mat (10) and collection and cleaning system (11) for collecting and recycling the used wash water. Tire ramps (12) protect the distribution hose from crushing and damage as the vehicle being washed passes over the hoses.

8 Claims, 5 Drawing Sheets

UNDER BODY WASHER MECHANISM

FILTER TANKS
DETAIL 3

BAFFLE ISOMETRIC VIEW

UNDER BODY WASHER MECHANISM

FIG 5   DETAIL 1

DETAIL 2

PORTABLE VEHICLE UNDERBODY WASHING SYSTEM

BACKGROUND OF THE INVENTION

1. Field of Invention

The present invention relates to a portable vehicle washing system. More particularly, the present invention relates to a portable vehicle washing system which permits effective and thorough underbody washing to remove dirt and debris, including noxious weeds and seeds to reduce transfer of noxious weeds and pathogens to other geographic areas.

2. Description of Prior Art

While there are other portable washing systems, the present system is more compact and can be transported in the bed of a conventional pickup truck and provides moving booms for more effective washing and complete coverage of the underside of the vehicle being washed, including the area outside of the vehicle's frame (between the frame beams and the wheels and inside areas of body panels) of the vehicle being washed without substantial risk of damage to the vehicle or vehicle finish.

SUMMARY OF THE INVENTION

The present invention provides an improved, effective and efficient portable vehicle washing system for the thorough removal of dirt and debris, including noxious weeds and their seeds, from vehicles such as construction, farming/ranching, fire-fighting, and emergency equipment, to reduce transportation of pathogens to other geographic areas and damage to other vehicles from clods of mud or dirt or rocks from falling off during movement of the vehicles to other geographic areas and on roadways.

DETAILED DESCRIPTION OF THE INVENTION

Figure 1:
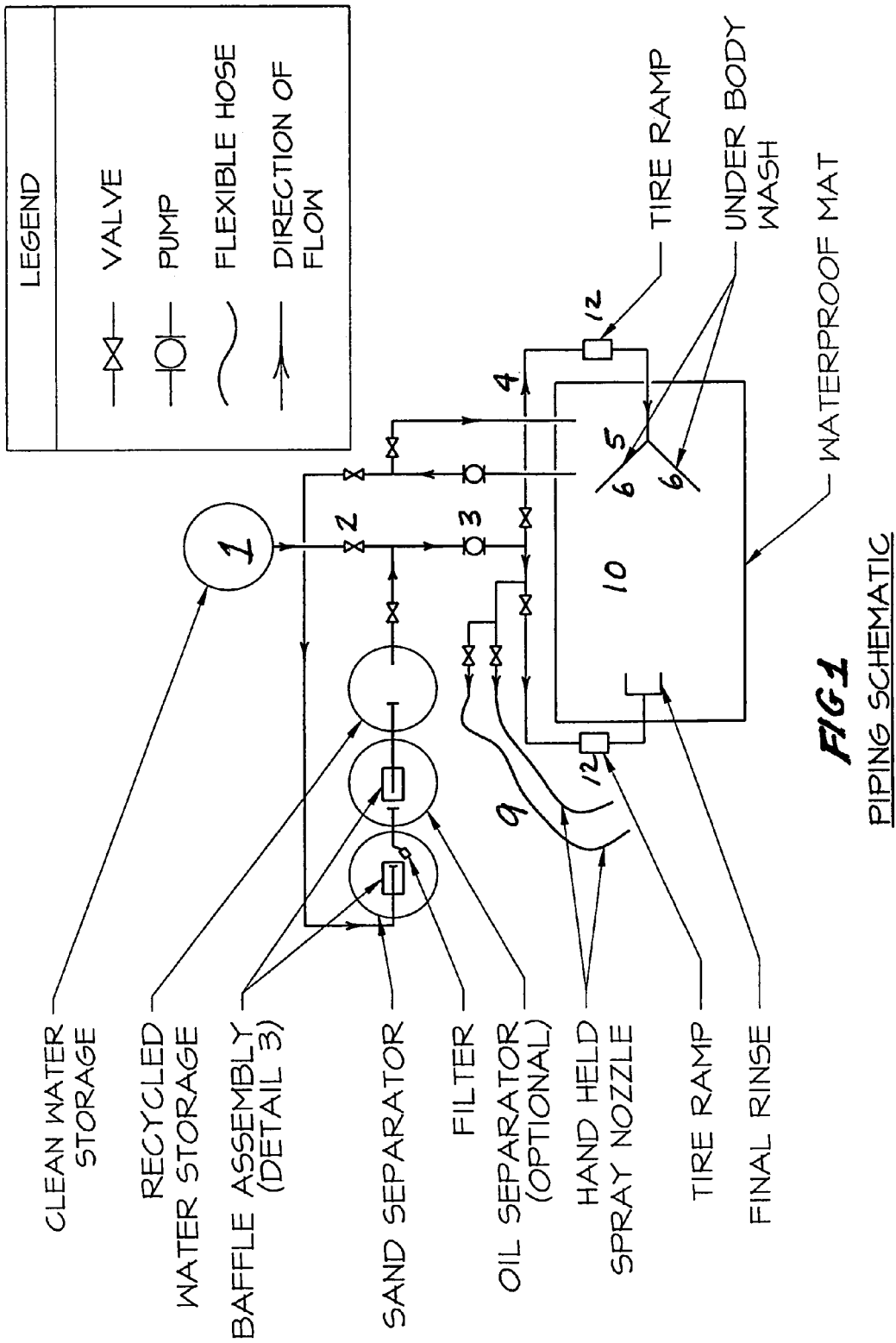
FIG. 1. is a top view of the piping schematic indicating the general layout of the elements of the device, including clean water storage tank (1), supply hose line (2), pump (3), distribution hose lines (4), tire ramp, underbody wash booms (6), flexible hoses (9) with hand held wands having spray nozzles, final rinse nozzles, and used water recycling system (11) consisting of siphon line, pump, sand separator, baffle assembly, and recycled water storage.
Figure 2:
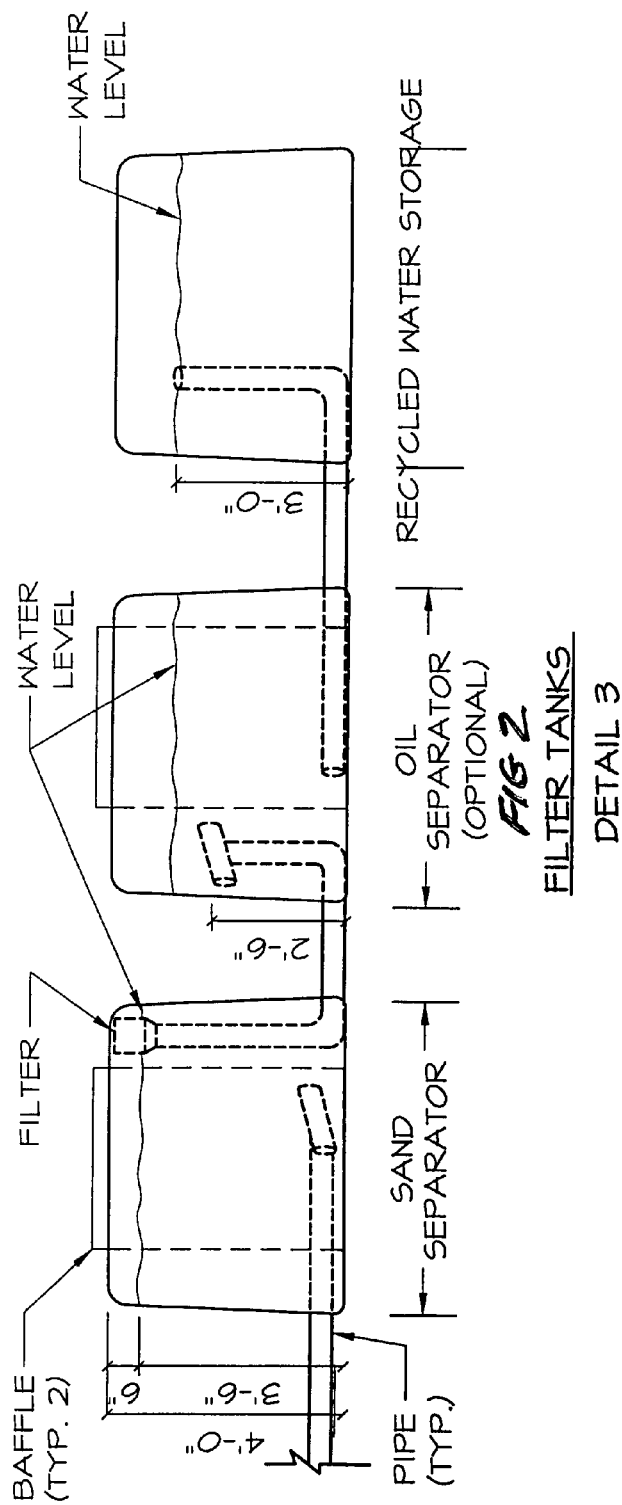
FIG. 2. is a side view of the sand separator and baffle assembly filter tanks and recycled water storage tank.
Figure 3:
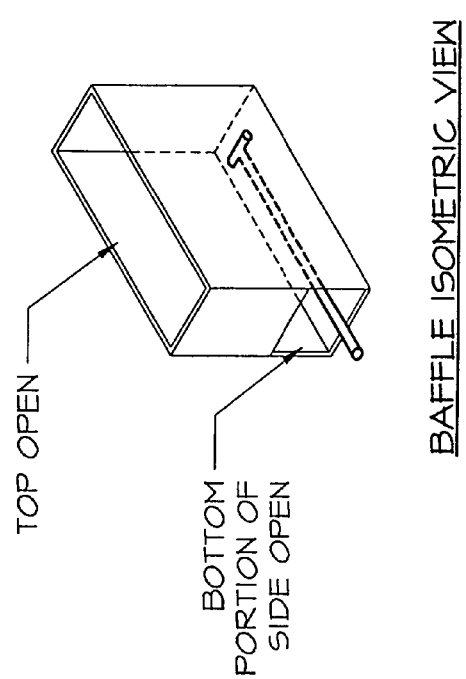
FIG. 3. is an isometric view of the baffle assembly.
Figure 4:
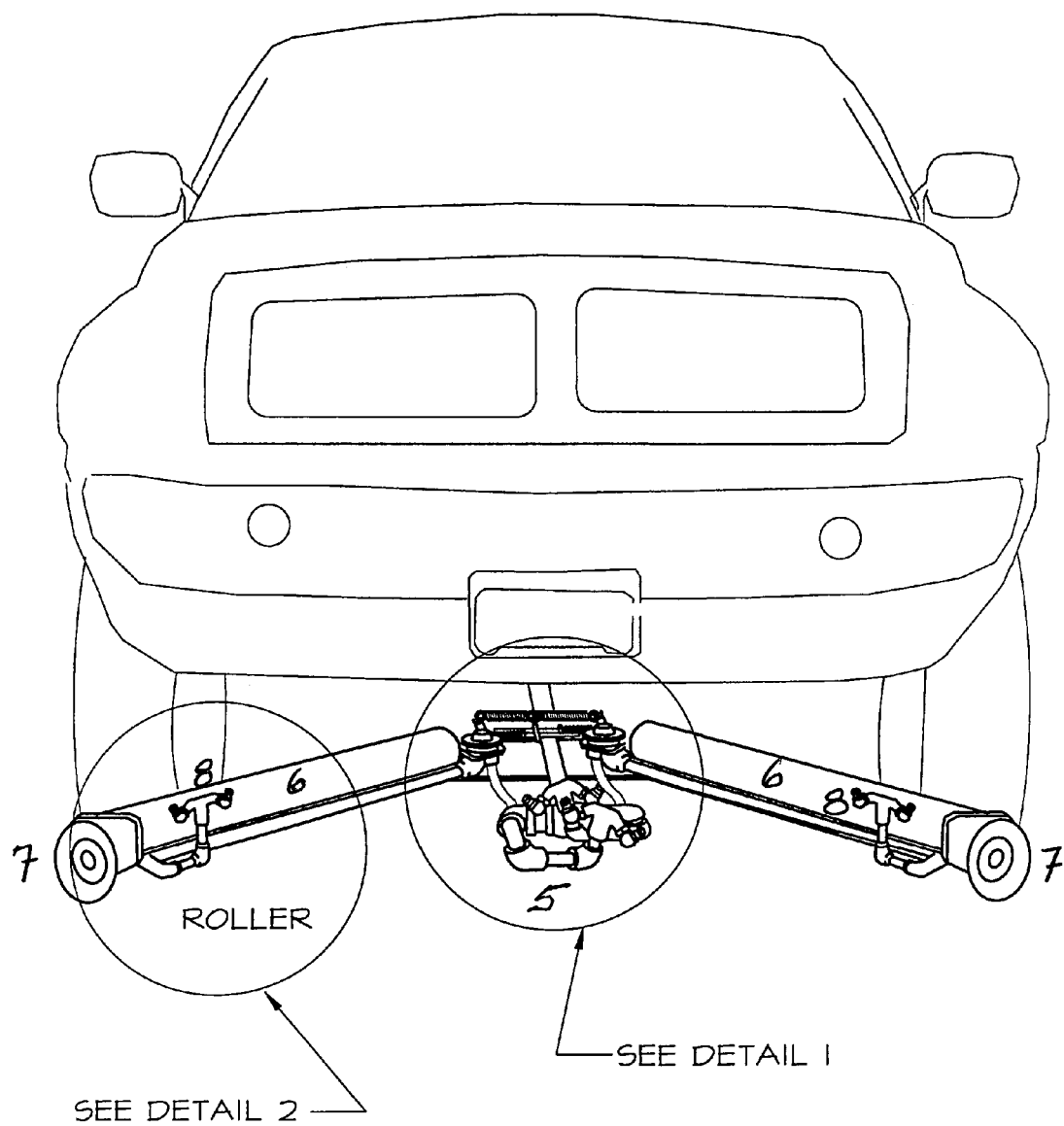
FIG. 4. is the under body washer mechanism (5), including rollers (7), pivoting booms (6), and spray nozzles (8) and water delivery mechanism.
Figure 5:
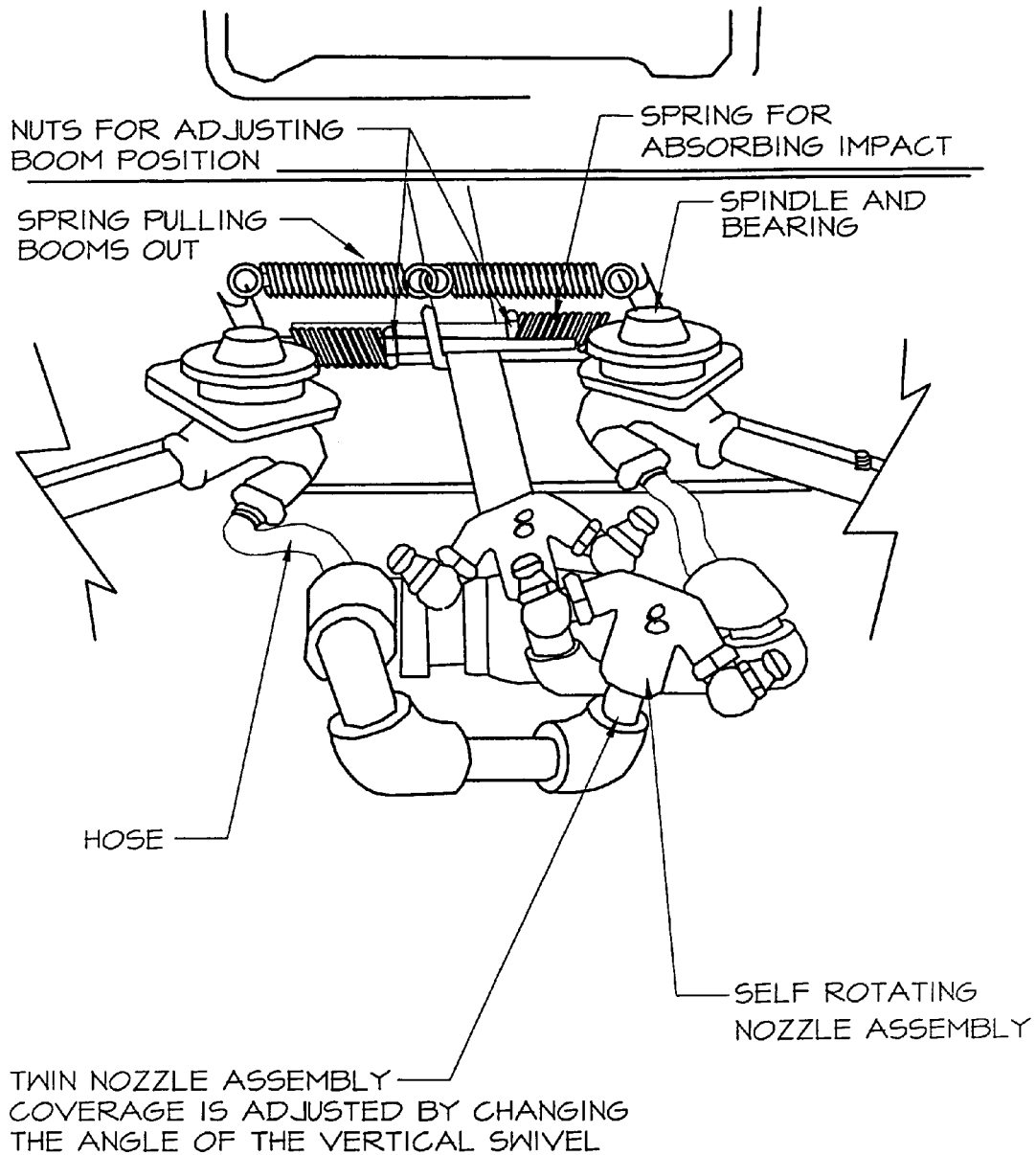
FIG. 5. is a detail of the spray nozzle assembly including springs to enable the booms to pivot outward when not retracted by the movement of the tires of the vehicle being washed against the pivoting booms.
Figure 6:
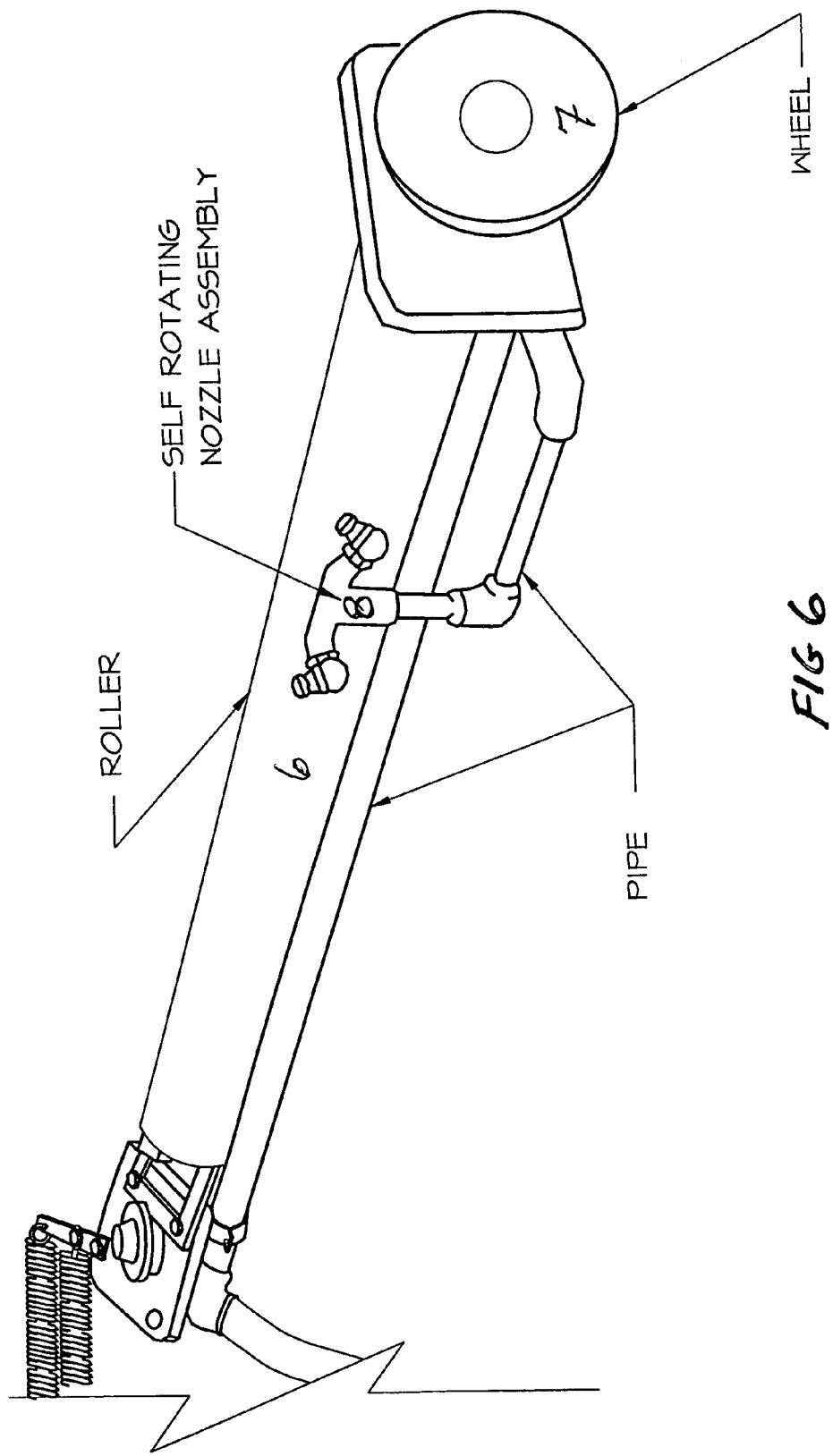
FIG. 6. is a detail of one of the pivoting booms (6), with the delivery piping system and the spray nozzle assembly.

The present invention involves an inflatable, self-supporting clean water storage supply tank (1) and a gravity-flow supply water hose line (2) which conveys the clean water from the tank to a pressurizing pump (3), which pump sends the water through distribution water hose lines (4) to a spray assembly, flexible hoses with hand-held wash wands having spray nozzles, and separate hoses with final rinse spray nozzles. An impermeable waterproof fabric mat (10) allows for collection of the used wash water, which water is drawn off through a collecting tube and pumped into a baffled settlement and cleaning system and then delivered to a water storage tank for the recycled used wash water to be reused or for disposal.

REFERENCES CITED

| | | |
|---|---|---|
| 5,029,758 | Chayer | July 1991 |
| 5,033,489 | Ferre, et alia | 3 Jul. 1991 |
| 5,638,843 | Strickland | 7 Jun. 1997 |
| 5,800,087 | Tomasik | September 1998 |
| 6,237,614 | Retter | 9 May 2001 |
| 6,446,881 | You | 0 Sep. 2002 |
| 6,571,809 | Cladwell, et alia | 3 Jun. 2003 |
| 6,595,438 | You | 22 Jul. 2003 |

I claim:

1. A portable vehicle underbody washing device comprising:

a supply water holding tank (1) and gravity-flow supply hose (2) to a pressurizing pump (3) which pressurizes the water and forces it through pressurized distribution hoses (4) through pivoting booms (6) and spray nozzles (8), with rollers (7) to allow the movement of the vehicle being washed to cause the booms to pivot and rotate horizontally inward toward the center of the vehicle and to allow the vehicle to be driven, pushed, or towed over the booms and a waterproof retaining mat (10) in which the used wash water is collected and from which the used wash water is drawn by a pump through a tube to clean, recycle, and reuse the used wash water or to reduce pollutants in the used wash water before disposal.

2. The washing device described in claim 1 in which the supply water tank (1) is a rubber or other flexible waterproof material which, when emptied of water is sufficiently flexible and resilient to be gathered and/or folded into a small volume, and when containing water is sufficiently strong to retain the water without additional lateral support.

3. The washing device described in claim 1 in which the water is under 240 pounds per square inch (psi) to 290 psi pressure and delivered in a solid stream at 6 to 9 gallons per minute (gpm) to the vehicle being washed through spray nozzles (8) rotating at 60 to 120 rotations per minute (rpm).

4. The washing device described in claim 1 with booms (6) to distribute the water spray across the underbody of the vehicle being washed.

5. The washing device described in claim 1 with booms (6) pivoted at the inside (near the center of the vehicle being washed) ends and rollers (7) to enable the booms (6) to rotate inward as the vehicle being washed passes over the pivoting booms (6).

6. The washing device described in claim 1 with spray nozzles (8) to control the delivery of the wash water so as to remove the dirt and debris without damaging the vehicle being washed.

7. The washing device described in claim 1 with spray nozzles (8) to control the water pressure for optimum cleaning and minimum damage to the vehicle being washed and flexible hoses with hand-held water spray wands, and nozzles to provide a final rinse.

8. The washing device described in claim 1 with an impermeable mat (10) upon which the booms (6) and spray nozzles (8) are placed and over which the vehicle being washed is driven, pushed, or pulled with sides to allow collection of the used wash water and a collecting tube to withdraw the used wash water for cleaning, recycling, and reuse.

* * * * *